Figure 1:
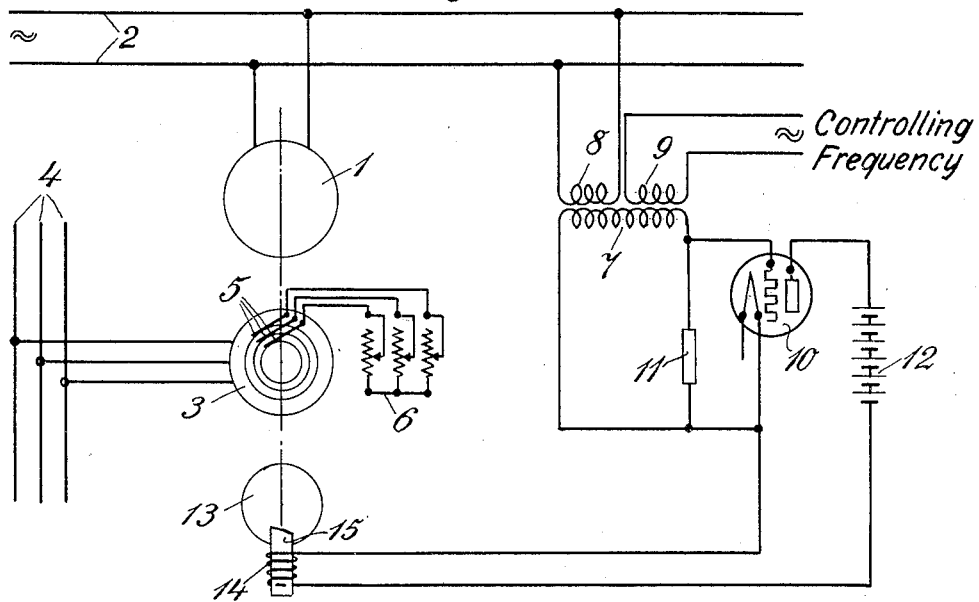

March 4, 1930.  W. SCHEPPMANN ET AL  1,749,304
APPARATUS FOR SPEED REGULATION OF ROTATING BODIES
Filed Dec. 9, 1927

Inventors:
Wilhelm Scheppmann
and Adolf Eulenhöfer
by
Attorney

Patented Mar. 4, 1930

1,749,304

UNITED STATES PATENT OFFICE

WILHELM SCHEPPMANN, OF BERLIN-TEMPELHOF, AND ADOLF EULENHÖFER, OF KONIGSWUSTERHAUSEN, NEAR BERLIN, GERMANY, ASSIGNORS TO C. LORENZ AKTIENGESELLSCHAFT, OF BERLIN-TEMPELHOF, GERMANY

APPARATUS FOR SPEED REGULATION OF ROTATING BODIES

Application filed December 9, 1927, Serial No. 238,881, and in Germany December 11, 1926.

This invention has reference to an apparatus for maintaining at a constant speed two or more rotating bodies such as prime movers and the like. One of the chief objects of the invention consists in that it enables the speed of the rotating body to be kept up at a predetermined constant value within extremely narrow limits of deviation from normal state which makes an apparatus embodying the features of this invention especially adapted for use in all cases where a high accuracy of constancy of the speed of rotation is of vital importance, as for instance in connection with high frequency generating systems comprising a high frequency dynamo-electric alternator driven by a suitable prime mover and producing a fundamental frequency which may be raised by means of stationary frequency transformers to a desired multiple utilization frequency for wireless communication purposes. With such a system, in order to secure a constant wave length to be radiated, it is of the utmost importance, that the speed of rotation of the high frequency alternator be kept constant within very slight limits. The recent art of speed regulation, especially the design of speed regulating devices acting according to the well-known Tirrill principle (for reference see U. S. Patent No. 1,647,020) has rendered it possible to generate wave lengths down to 300 meters by machine transmitters with a constancy of the radiated wave length equal to that obtained by a corresponding vacuum tube transmitter hitherto employed exclusively in practice for this purpose. When further shortening the wave lengths to be produced by a high frequency alternator in connection with stationary frequency raisers e. g. those of the iron-cored type, the difficulties of speed constancy increase accordingly to a comparatively large extent, as will be readily understood and it is a special object of the present invention to overcome these difficulties and to yield to the very highest practical requirements of speed constancy of a rotating body, such as for instance of a high frequency alternator in connection with a system referred to.

According to this invention, the speed of rotation of a revolving body is constantly controlled by means of two alternating electric currents, one of which is of constant and fixed amplitude and frequency and will hereinafter be referred to as the controlling current or the controlling frequency. This current may be supplied by any one of the well known devices producing a constant frequency such as for example a tuning fork generator, a small vacuum tube generator controlled by a piezo-electric crystal oscillator and the like. The other alternating current being provided in accordance with the present invention and referred to hereinafter as the auxiliary current is generated by the rotating body the speed of which is to be regulated and therefore possesses a distinct frequency and phase relationship with respect to it. Both currents, the controlling current and the auxiliary current are superimposed in the speed regulating apparatus upon each other and their mutual phase difference is used as a means responsive to deviations from the normal value of the speed of the body whose speed is to be controlled. As soon as the normal speed changes by only an extremely slight degree, corresponding minute phase changes between both currents will take place instantly and without any perceptible time lag. These minute phase changes produce a change of the resulting current containing both currents as its components which changes of the resulting current are used to act upon a speed influencing means adapted to restore the orignal speed of rotation. As such a means for restoring normal speed, an eddy current brake may be provided acting on the speed of the body to be controlled or the resultant current changes may act directly upon a speed determining means of a prime mover driving the body to be controlled e. g. upon the shunt circuit of an electric motor.

The aforesaid and various other objects of our invention will become apparent on consideration of some embodiments which are chosen for illustration and will be presented by way of example in the following detailed description taken with reference to the accompanying drawings. It will be understood, that the invention is defined in the appended claims and that the following description relates more particularly to the examples shown in the drawings.

Referring to the drawings, Figure 1 is a diagram illustrating an apparatus showing one form of embodiment of the invention.

Figure 2:
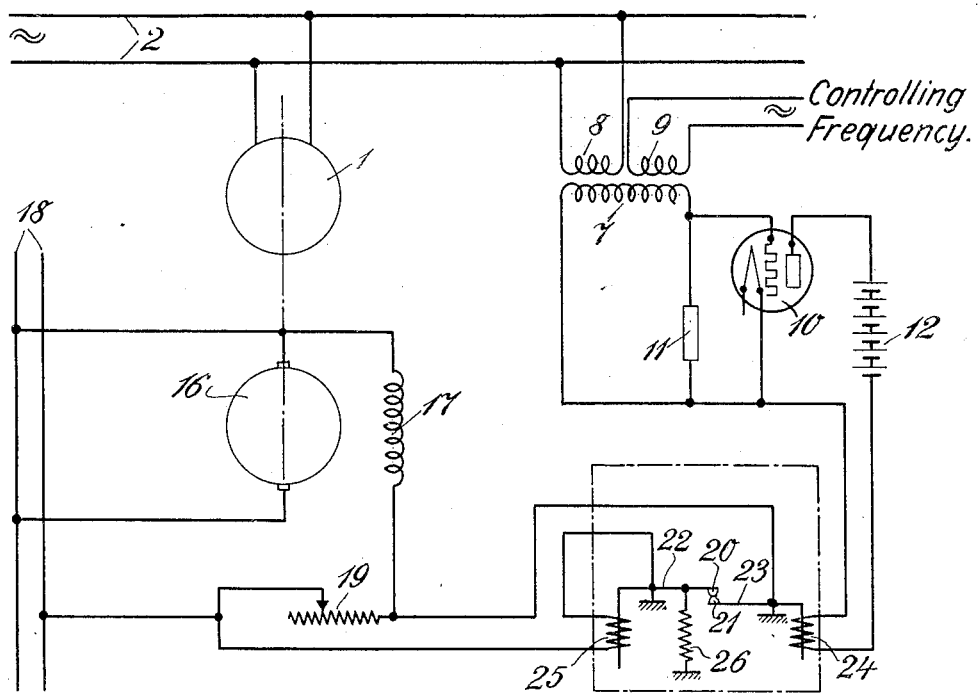

Figure 2 shows an apparatus similar to that of Figure 1.

Similar reference numbers throughout the drawings refer to similar elements.

Referring more particularly to Figure 1, 1 represents a high frequency alternator whose exciting winding is not shown in the drawing for simplicity's sake, supplying a high frequency load system 2, e. g. a wireless plant of the type referred to above. The alternator is driven by a three-phase motor 3 supplied by the three-phase mains 4. 5 represents the slip-rings of the motor and 6 its rotor starting resistance. According to the invention a control current having as constant a frequency as practicable is provided feeding one primary winding 9 of a transformer of the differential type. This control frequency may be supplied for instance by a vacuum tube generator controlled by a piezo-electric crystal device which ensures a very constant frequency, or by a tuning fork generator, or by a small dynamo electric generator provided with a flywheel containing a comparatively large mass and driven by an electric motor of very uniform speed, or the like.

The control frequency is superimposed in the common secondary 7 of the transformer upon a frequency derived from the body to be controlled, in the example shown the frequency generated by the alternator 1. In case of the machine 1 to be regulated not being an alternating current generator, as in the present example, a special small auxiliary A. C. generator may be mounted on a common axis with the machine 3 to be regulated for the supply of an auxiliary current to be applied to the primary 8 of the transformer. The resultant superimposed current in the winding 7 is applied to the grid of a normal three-electrode vacuum tube whose anode circuit includes a device adapted to act upon the speed of rotation of the machine 3 to be regulated. 11 is a grid coupling resistance and 12 is the anode battery for the tube. As such a speed influencing means for the prime mover 3, an eddy-current brake 13 is mounted on a common shaft with it having a braking magnet 15 bearing a winding 14 included in the anode circuit of the tube 10.

In practice, the aforesaid conditions may be obtained and the apparatus adjusted for practical operations as follows. The speed of the prime mover 3 is to be brought gradually to its normal value. An amperemeter inserted into the anode circuit of tube 10 will thereby show at first strong oscillations, whereas with approach of normal speed of rotation and a corresponding approach of the frequency of the current generated by the alternator 1 to the frequency of the controlling current, beats becoming slower and slower will take place, until with correct adjustment within the stable range of operation only very slight controlling oscillations of the indicating hand of the amperemeter about its mean value during operation may be observed.

Instead of one vacuum tube, several may be provided in cascade connection for amplifying purposes, as may be well understood. Also instead of an eddy-current brake, as described, any suitable means acting upon the speed machine 3, which may be any sort of prime mover and responsive to minute current variations, may be provided e. g. the controlling current may act directly on a regulating element in the field circuit of an electric motor serving as prime mover driving the alternator 1 as shown by another form of embodiment of the invention represented by Figure 2.

In order not to destroy or to diminish the instantaneous operation of the apparatus of the invention based on the use of phase variations and electronic devices, by the electromagnetic inertia of the self-induction of the winding of the eddy-current brake, one or more vacuum tube devices may be provided to act as rectifiers, so that the winding of the eddy-current brake is not influenced by currents of the higher frequency but only by the mean value of the rectified and therefore smoothed out currents whereby the influence of electromagnetic inertia is diminished or practically suppressed.

Referring to Figure 2, the system shown here differs from that represented by Figure 1 in that an electric D. C. motor is provided as prime mover for the high frequency alternator 1 and in that a vibrating regulator of the well known type is interposed between the vacuum tube output and the speed controlling circuit of the prime mover for the purpose specified hereafter. When regulating machines of comparatively large power are employed according to Figure 1 corresponding large controlling power is necessary for regulating the speed. This implies that the resultant current changes originating from changes of the phase difference of the controlling and the auxiliary currents, must be amplified to a value to act directly upon the eddy-current brake. In case of large powers of the prime mover, however, many stages of amplifying cascades would be necessary which involves larger costs and decreases the reliability of operation, apart from the involved complication of the whole plant. According to another object of this invention, the aforesaid drawback may be overcome by the interposition of a regulator of the vibrating type between the tube 10 and the speed influencing means of the prime mover 1.

Referring more particularly to the apparatus shown by Figure 2, the prime mover 16 is a D. C. shunt wound motor supplied by the D. C. mains 18 and having a field winding 17 containing in series a regulating resistance 19. The output anode current of the tube 10 controls a vibrating regulator of the well-known Tirrill-type, whose vibrating contacts are opening and short-circuiting periodically the resistance 19 in the shunt circuit of the motor 10. The vibrator consists of two moving contacts 20 and 21 arranged each at the free end of two levers 22 and 23 respectively, one of which levers 22 serves to make and break contact intermittently by a sort of self-interrupting action, whereas the other lever 25 is maintained at a distinct mean position through the magnetic pull of a coil 24 inserted into the anode circuit of the tube 10, thus determining the ratio of contact making to contact breaking of the contact 22 and 23, which ratio in its part is a measure of the mean exciting current flowing in the field circuit of the motor 18 and thus indirectly determines its speed of rotation. 25 is a coil acting on the lever 22 bearing contacts 20 included in the short-circuiting path of the regulating resistance 19. 26 is a spring intended to hold the contacts normally in a closed position.

The operation of the apparatus of Figure 5 is as follows:

Suppose the contacts 20 and 21 to be closed, then the resistance 19 in the shunt circuit of the motor 16 is short-circuited. The field current of the motor is flowing through coil 25, contacts 20 and 21. A comparatively strong current is flowing through the short-circuit path whereby the magnetic field established within the coil 25 attracts an extension on the lever 22 opening contacts 20 and 21. Thus, the short circuit path is opened and the exciting current of the motor is forced to pass through the resistance 19. The field within coil 25 breaks down and the lever 22 returns by the action of the spring 26 to its normal position closing the contacts 20 and 21 again, the whole process repeating itself periodically. The exciting current of the motor 16 thus constantly oscillates to and fro about a mean value which latter determines the actual speed of rotation. This mean value is dependent on the ratio of the short-circuiting and opening periods of the contacts 20 and 21 which ratio is determined, as stated above, by the mean position of the lever 23 dependent on the strength of the anode current of the tube 10, or dependent, in other words, on deviations of speed of the motor 3 from its normal value. In case for instance, of the motor 1 increasing its speed by a small degree beyond the normal value, a decrease of the phase difference $\Delta\varphi$ of the auxiliary current with respect to the controlling current takes place, provided the working point is adjusted within the stable range of operation (see Figure 2). This ensures a corresponding increase of the anode current of tube 10 whereby the magnetic field within the coil 24 is increased accordingly and the lever 25 is moved in an anti-clockwise direction thus enlarging the mean distance of contacts 22 and 21. Thereby, the time of contact opening within one regulating period is decreased and the time of closing correspondingly increased, whereby the mean exciting current of motor 16 assumes instantly and without any time lag a higher value. This higher value causes a tendency of decrease of the speed of the motor, whereby the assumed initial increase of speed beyond its normal value is instantly cancelled in its very rise.

According to another object of the invention an additional apparatus for the regulating of the speed of the motor being of a well-known type e. g. ordinary centrifugal regulator may be provided besides the apparatus forming the subject matter of this invention, which former apparatus is intended to balance the larger and more abrupt deviations of the speed whereas the apparatus according to the invention is to control only the very minute deviations occurring within these larger and stronger deviations.

In the case of machines of very large power to be regulated, whereby the controlling power assumes a considerable value, a special loading dynamo may be provided instead of a braking device or the like. This loading dynamo is mounted on a common axis with the motor to be controlled and is working upon a loading circuit and the regulating apparatus acts to influence the loading circuit or the exciting circuit of the dynamo loading machine.

What we claim to be secured by Letters Patent in the United States is:

1. In combination in a system for maintaining constant the speed of prime movers, a prime mover, a vibration regulator controlling a speed influencing circuit associated with said prime mover, means for deriving an electrical current having a frequency proportional to the speed of the said prime mover, further means for producing a controlling alternating current of substantially constant frequency, both currents being of equal frequency in a state of normal speed of said prime mover, means for superimposing said currents upon each other, for obtaining a resultant current which varies in accordance with variations in the speed of said prime mover and means for applying said resultant current to said vibration regulator to vary the regulating conditions of said vibration regulator.

2. In a system for maintaining constant the speed of rotation of prime movers, comprising a prime mover, a device for producing a controlling alternating current of substantially constant frequency, further means for producing an auxiliary alternating current with a periodicity corresponding to the speed of rotation of said prime mover and having a distinct phase relationship with respect to it, both currents being of equal amplitude and frequency in a state of normal speed of said prime mover, means for superimposing said currents upon each other, for obtaining a resultant current which varies in accordance with variations in the speed of said prime mover, a control circuit including a three electrode tube having its grid and filament influenced by said resultant current, a vibration regulator having contacts periodically influencing a speed responsive electric circuit of said prime mover, and means to vary the relative opening and closing periods of said contacts, said means being controlled by the output currents of said vacuum tube.

In testimony whereof we have affixed our signatures.

WILHELM SCHEPPMANN.
ADOLF EULENHÖFER.